United States Patent [19]

Huntley

[11] Patent Number: 4,860,013

[45] Date of Patent: Aug. 22, 1989

[54] AUTOMATIC THRESHOLDING MULTICHANNEL DIGITAL RADAR EARLY WARNING SYSTEM

[75] Inventor: William P. Huntley, Old Lyme, Conn.

[73] Assignee: The United States of America as represented by the Secretary of the Navy, Washington, D.C.

[21] Appl. No.: 176,958

[22] Filed: Apr. 4, 1988

[51] Int. Cl.$^4$ .............................................. G01S 7/40
[52] U.S. Cl. ................................................... 342/20
[58] Field of Search ................................... 342/13, 20

[56] References Cited

U.S. PATENT DOCUMENTS

| | | | |
|---|---|---|---|
| 3,465,253 | 9/1969 | Rittenbach | 342/20 X |
| 3,660,844 | 5/1972 | Potter | 342/20 |
| 4,313,216 | 1/1982 | Jaeger et al. | 342/20 X |
| 4,700,191 | 10/1987 | Manor | 342/20 X |

Primary Examiner—Thomas H. Tarcza
Assistant Examiner—Mark Hellner
Attorney, Agent, or Firm—Arthur A. McGill; Prithvi C. Lall; Michael J. McGowan

[57] ABSTRACT

An RF multiplexer divides an incoming signal from an RF antenna into discrete frequency bands. Each frequency band has its own separate circuit on separate lines to operate on the frequency band and determine if a radar signal is present or if only noise is present on the line. This is done by comparing the incoming signal for magnitude with a DC signal that is generated within the circuit and is proportional to the noise within the frequency band. An indication that any of the signals within the discrete frequency bands exceed the DC signal generated within the same band results in an alarm indication.

5 Claims, 2 Drawing Sheets 4,860,013

AUTOMATIC THRESHOLDING MULTICHANNEL DIGITAL RADAR EARLY WARNING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to radar early warning systems. More particularly the system provides multiband detection of radar emissions without sensitivity degradation due to summation of wideband noise.

(2) Description of the Prior Art

Prior to the present invention early warning radar receivers utilized summation of many RF bands following initial RF detection. This was followed by pulse stretching, additional amplification and an audio output. Due to many channels being summed together the summed video noise rises and sensitivity suffers. Due to difficulty in discerning between radar pulses and noise the audio output warning of radar illumination was reduced in reliability.

SUMMARY OF THE INVENTION

The present invention is a radar omnidirectional passive early warning system. Unlike prior art systems video summation does not occur in an analog fashion. In the present system, following each video amplifier a noise compensator determines the noise level at each output of a video amplifier and generates a DC voltage level that is proportional to the video amplifier output noise level. A threshold comparator compares the output of the video amplifier and noise compensator and provides an output signal only when the video signal from the video amplifier exceeds the DC voltage level from the noise compensator by a predetermined value. When any of a plurality of threshold comparators provides an output signal, this output signal is processed to enable an audible warning to be provided.

DESCRIPTION OF THE PREFERRED EMBODIMENT

Figure 1:
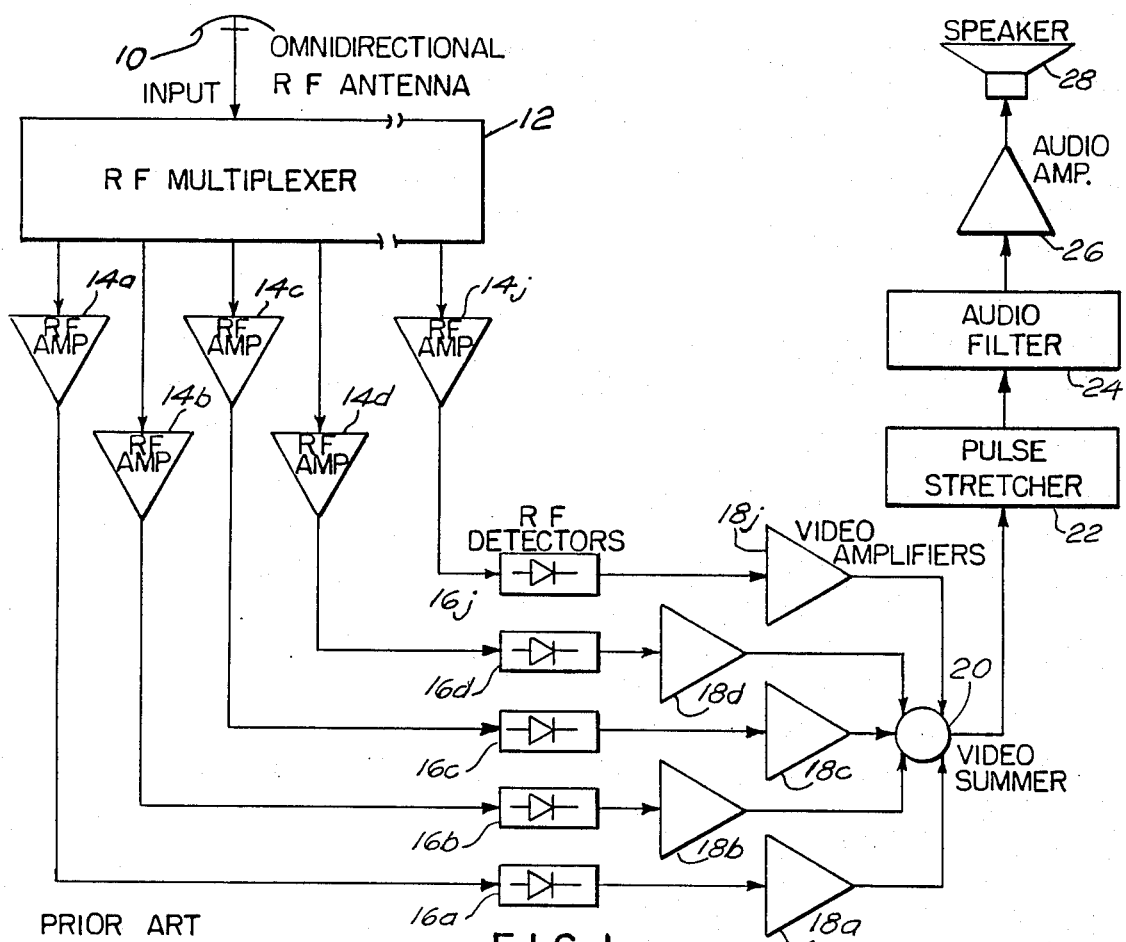
FIG. 1 is a diagram of a prior art early warning radar receiver.

Referring now to FIG. 1 there is shown a prior art embodiment of a multiband early warning radar system. An omnidirectional RF antenna 10 receives a signal and provides it to an RF multiplexer 12. The RF multiplexer divides the signal into a plurality of discrete frequency bands and provides these signals to respective RF amplifiers 14a-j. These signals, each within a discrete frequency band are supplied to respective RF detectors 16a-j. Although the number of bands utilized is somewhat arbitrary, ten bands are chosen for all embodiments described herein. The respective signals are then processed by video amplifiers 18a-j. The output signals of the video amplifiers 18a-j are transmitted to video summer 20. The video summer 20 provides an output signal that will contain not only the radar emission signal but the video noise signal as well. Since all channels contain noise signals, but not all contain a radar emission signal, the summation of the input signals by video summer 20 tends to overwhelm any radar emission signal with noise. As a result sensitivity suffers. The output signal of video summer 20 is then processed by pulse stretcher 22 and audio filter 24. Following this the signal is received by an audio amplifier 26 and speaker 28 that provides an audible warning.

Figure 2:
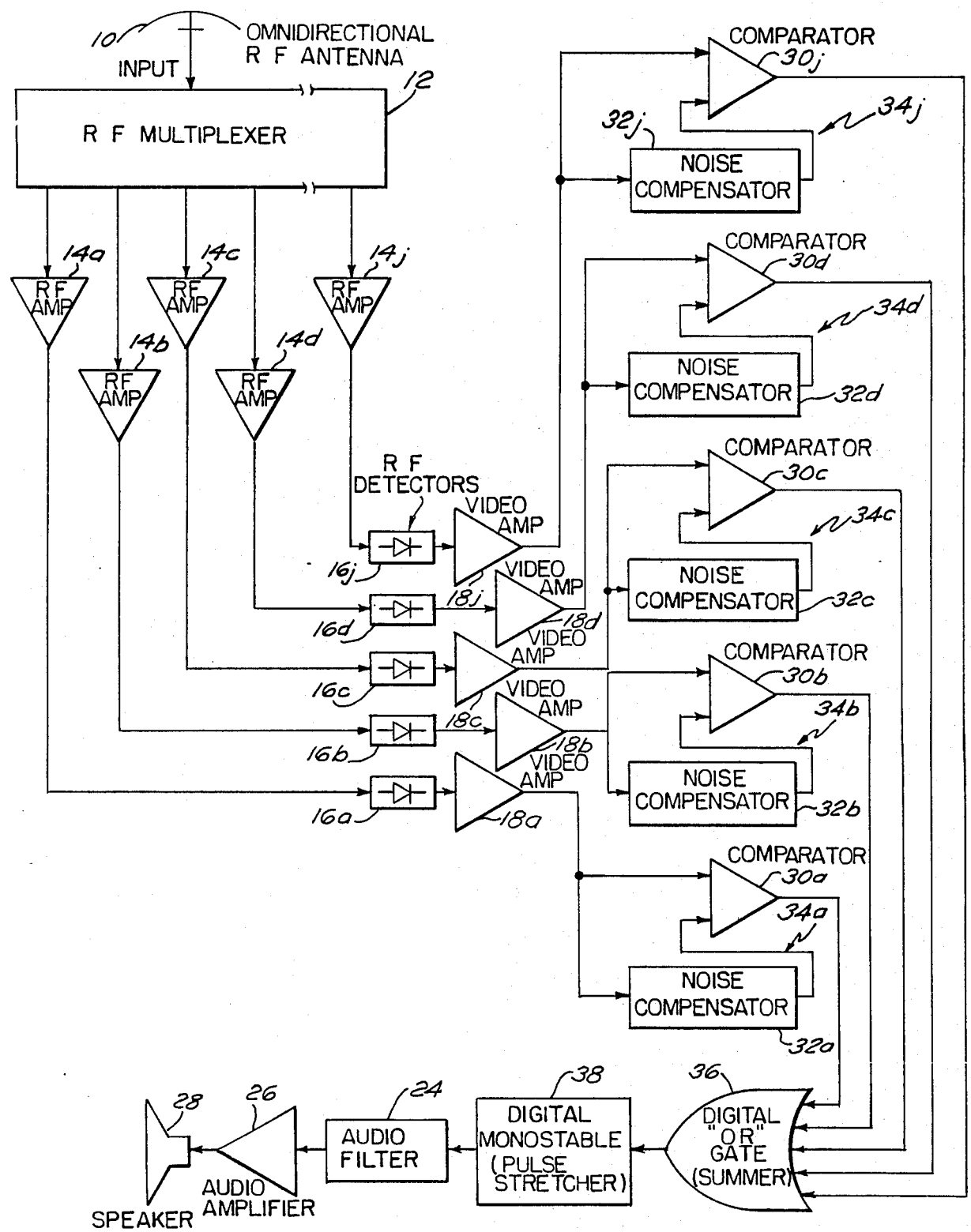
FIG. 2 shows a diagram of an early warning radar receiver in accordance with the present invention.

FIG. 2 shows a system arrangement of the present invention wherein similar components to those of prior art FIG. 1 have the same identifying numeral. In FIG. 2 a signal received by omnidirectional antenna 10 is processed by RF multiplexer 12, RF amplifiers 14a-j, RF detectors 16a-j and video amplifiers 18a-j in a similar manner to that described with reference to FIG. 1.

FIG. 2 then shows that the signal from each video amplifier 18a-j is provided individually to both a comparator 30a-j and a noise compensator 32a-j. In addition, each noise compensator 32a-j provides its output signal to a respective comparator 30a-j. Each combination of a comparator 30a-j and a respective noise compensator 32a-j are included in a noise riding threshold circuit 34a-j which will be described in greater detail later. Signals from each of the comparators 30a-j within noise riding threshold circuits 34a-j that break threshold provide individual inputs to the same digital OR gate 36. The OR gate 36 on receipt of a signal from any comparator 30a-j provides a signal to a digital monostable 38 which provides a pulse stretching function and therefore increases the energy content of the narrow pulses. An audio filter 24 is then utilized to reduce high frequency electro-magnetic interference (EMI). The output of audio filter 24 is conducted to an audio amplifier 26 that drives a speaker 28 providing an audible warning.

Figure 3:
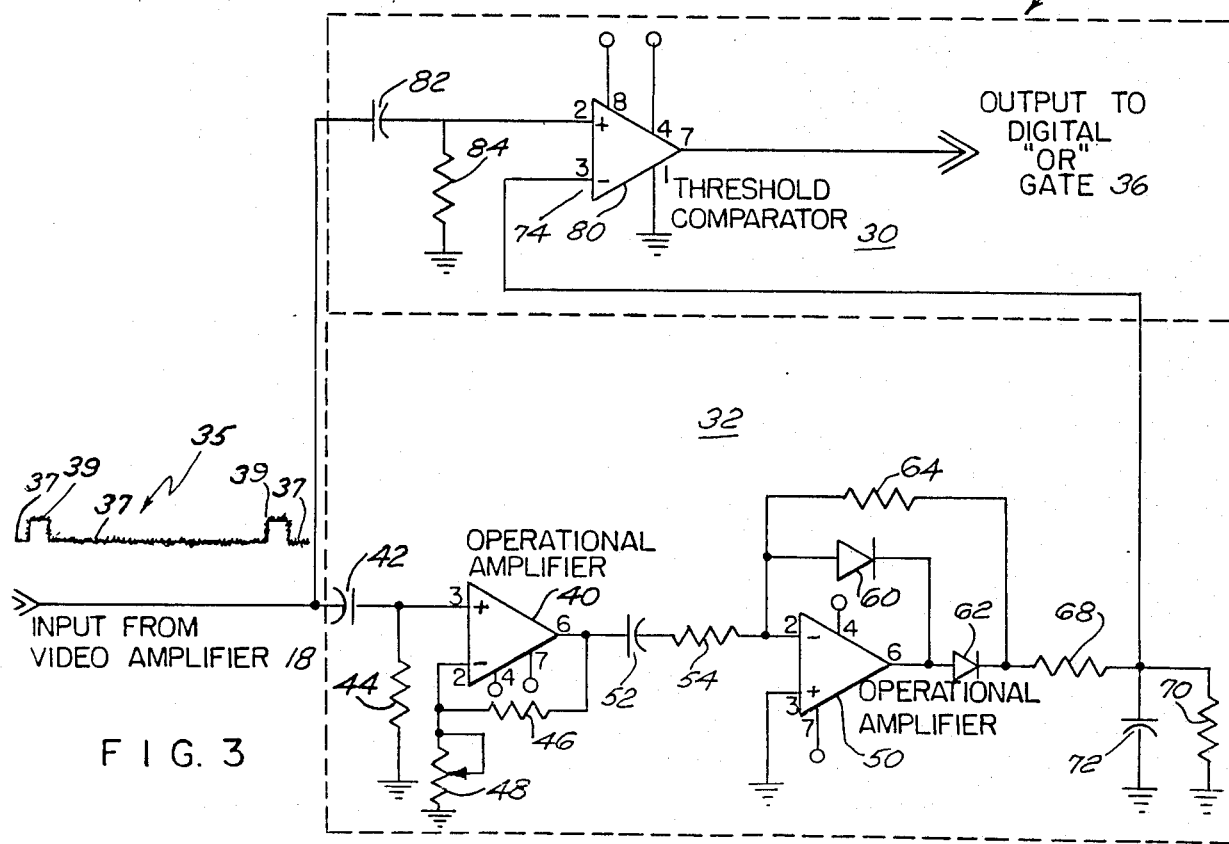
FIG. 3 is a schematic diagram of a noise riding threshold circuit shown in FIG. 2.

Refer now to FIG. 3 for a detailed description of noise riding threshold circuit 34. All noise riding threshold circuits 34a-j of FIG. 2 operate in the same manner. All components described in FIG. 3 use only numerals. These components are identical to the ones in FIGS. 1 and 2 that have the same numerals and an identifying letter.

The noise compensator 32 and the comparator 30 within the noise riding threshold circuit 34 receive an input signal 35 from video amplifier 18. The input signal 35 is comprised of noise components 37 and the radar emission pulse 39. The radar emission pulse 39 only appears for a short period of time in a complete cycle. Obviously if there is no received pulse at antenna 10 of FIG. 2 only the noise components 37 will be present. The noise components 37 appear throughout the cycle. In the present invention the DC level of the video amplifier 18 output is about 1.5 volts.

Within noise compensator 32 an operational amplifier 40 receives the input signal 35 from video amplifier 18 through a DC blocking capacitor 42 and a load resistor 44. Resistor 44 establishes the DC input level at 0 volts. Operational amplifier 40 has connected to it a resistor 46 and a variable resistor 48 so that the operational amplifier 40 functions as a high impedance non-inverting amplifier. The amount of gain can be adjusted by the variable resistor 48. In the present system the gain is approximately ten. The output of operational amplifier 40 is supplied to an operational amplifier 50 through a high pass filter comprised of a capacitor 52 connected in series with a resistor 54. The operational amplifier 50 has its non-inverting input terminal grounded. The operational amplifier 50 in conjunction with diodes 60 and 62, and resistor 64 is arranged as a rectifier circuit. The output of the rectifier circuit appears on terminal 66 and is applied to a low pass filter comprised of resistors 68 and 70, and capacitor 72 for providing a DC voltage from the rectified video noise signal. In effect the noise compensator 32 provides a DC output voltage at terminal 74 that is proportional to the negative portion of the input noise signal.

The output signal from video amplifier 18 is also supplied to the positive input of threshold comparator 80 through DC blocking capacitor 82. A load resistor 84 connects the positive input of threshold comparator 80 to ground establishing the DC input level at 0 volts, similar to that of amplifier 40 of noise compensator 32. The output of threshold comparator 80 is the output of comparator 30 and noise riding threshold circuit 34. This is supplied to digital OR gate 36 as previously described.

In operation the output of the video amplifier 18 serves as input to the noise compensator 32. The video noise signal 35 from video amplifier 18 is fed to non-inverting ac amplifier 40 where its voltage is amplified. This amplification allows linear detection in the next stage using the medium bandwidth operational amplifier 50. Operational amplifier 50 and its circuits form a linear detector that detects the negative peaks of the noise signal while ignoring the positive video pulses that may attempt to desensitize the circuits. Resistor 68 and capacitor 72 integrate the peak pulses to produce a dc voltage that is proportional to the negative noise peaks of the input video signal 35. This DC voltage is applied to the comparator 30 at the negative input of threshold comparator 80. The video input signal 35 is also fed to threshold comparator 80 through DC blocking capacitor 82. When the video signal on threshold comparator 80 that was fed through DC blocking capacitor 82 exceeds the DC voltage formed by resistor 68 and capacitor 72 from operational amplifier 50 a signal is formed at the output of threshold comparator 80. This output signal is fed to the digital OR gate 36 and through further processing becomes an audible alarm.

The system described above allows multichannel operation in early warning systems without noise degradation due to analog noise summation. The use of medium bandwidth noise compensation circuits makes the multichannel system feasible with regard to physical space and power dissipation.

As an alternative the addition of a computer interface to a multichannel system would allow energy detection in a computerized receiver system. The computer system can direct a narrow band receiver to certain frequency bands if analysis is required. Also, the addition of light emitting diode (LED) circuits at the outputs of the threshold comparators would provide visual indications as to what RF frequency bands provide the audible warning.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An automatic thresholding multichannel digital radar early warning system comprising:
   an antenna system for receiving signals over a range of frequencies;
   RF multiplexer and processing means connected to said antenna system for receiving said signals over said range of frequencies and for providing a plurality of output signals over separate paths, with each output signal having a discrete frequency band within said range of frequencies;
   a plurality of noise riding threshold means with each of said noise riding threshold means connected for receiving said output signals respectively over said separate paths from said RF multiplexer and processing means, each of said noise riding threshold circuit means having generating means for providing a DC voltage proportional to the noise within said received signal, and each of said noise riding threshold means for providing an output signal when the received signal from said RF multiplexer and processing means exceeds said DC voltage;
   an OR gate having separate input lines connected to receive respective outputs from said noise riding threshold circuits for providing an output signal upon receipt of a signal from any of said noise riding threshold circuits that indicate the noise riding threshold circuit received a signal containing radar emission pulses; and
   indication means connected to the output of said OR gate for providing a signal when said OR gate indicates one of said noise riding threshold circuits received a signal containing pulses other than noise.

2. An automatic thresholding multichannel digital radar early warning system comprising:
   an antenna system for receiving signals over a range of frequencies;
   RF multiplexer and processing means connected to said antenna system for receiving said signals over said range of frequencies and for providing a plurality of output signals over separate paths, with each output signal having a discrete frequency band within said range of frequencies;
   a plurality of noise riding threshold circuits connected to receive said output signals respectively over said separate paths from said RF multiplexer and processing means, each of said plurality of noise riding threshold circuits providing an output signal when the received signal contains radar emission pulses, each of said plurality of noise riding threshold circuits comprises a noise compensator connected to receive one of said plurality of output signals from said RF multiplexer and processing means for generating a DC voltage proportional to the noise within said received signal, and a comparator connected to receive at one input the same one of said plurality of output signals from said RF multiplexer and processing means as said noise compensator, and to receive at another input said DC voltage from said noise compensator, said comparator providing said noise riding threshold circuit output signal when said signal from said RF multiplexer and processing means exceeds said DC voltage from said noise compensator;
   an OR gate having separate input lines connected to receive respective outputs from said noise riding threshold circuits for providing an output signal upon receipt of a signal from any of said noise riding threshold circuits that indicate the noise riding threshold circuit received a signal containing radar emission pulses; and indication means connected to the output of said OR gate for providing a signal when said OR gate indicates one of said noise riding threshold circuits received a signal containing pulses other than noise.

3. An automatic thresholding mulichannel digital radar warning system according to claim 2 wherein said noise compensator further comprises:

first amplification means connected to receive one of said plurality of output signals from said RF multiplexer and processing means for adjusting the DC voltage level and for amplifying said signal; and second amplification means connected to receive said amplified signal from said first amplification means for rectifying said received signal and for generating a DC voltage proportional to the noise within the signal received by said first amplification means.

4. An automatic thresholding multichannel digital radar warning system according to claim 3 wherein said multiplexer and processing means further comprises:

a multiplexer connected for receiving signals over a range of frequencies from said antenna system and for providing a plurality of output signals over separate paths, with each output signal having a discrete frequency band within said range of frequencies;

a plurality of RF amplifiers connected to receive respective output signals over separate paths from said RF multiplexer;

a plurality of RF detectors connected to receive respective output signals over separate paths from said plurality of RF amplifiers; and a plurality of video amplifiers connected to receive respective output signals over separate paths from said plurality of RF detectors and to provide output signals to respective noise riding threshold circuits.

5. An automatic thresholding multichannel digital radar early warning system according to claim 4 wherein said indication means further comprises:

a digital monostable connected to receive a signal from said OR gate, said digital monostable providing a pulse stretching function;

an audio filter connected to receive the output of said digital monostable;

an audio amplifier connected to receive the output of said audio filter; and a speaker connected to receive the output of said audio amplifier.

* * * * *